US007065584B1

(12) United States Patent
Shavitt et al.

(10) Patent No.: US 7,065,584 B1
(45) Date of Patent: Jun. 20, 2006

(54) METHOD AND APPARATUS FOR NETWORK MAPPING USING END-TO-END DELAY MEASUREMENTS

(75) Inventors: Yuval Shavitt, Marlboro, NJ (US); Xiaodong Sun, Piscataway, NJ (US); Avishai Wool, Livingston, NJ (US); Bulent Yener, New York City, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 711 days.

(21) Appl. No.: 09/561,857

(22) Filed: Apr. 28, 2000

(51) Int. Cl.
*G06F 15/173* (2006.01)
*G06F 3/00* (2006.01)
*H04J 1/16* (2006.01)

(52) U.S. Cl. .................... 709/241; 709/223; 370/237; 370/238; 715/734

(58) Field of Classification Search ........ 709/223–224, 709/238–244; 345/734; 320/238, 237, 211, 320/235, 255, 389; 715/734
See application file for complete search history.

(56) References Cited

U.S. PATENT DOCUMENTS

| 6,031,528 | A  | * | 2/2000 | Langfahl, Jr. ............. | 709/224 |
| 6,216,163 | B1 | * | 4/2001 | Bharali et al. ............. | 709/227 |
| 6,347,339 | B1 | * | 2/2002 | Morris et al. ............. | 709/237 |
| 6,421,726 | B1 | * | 7/2002 | Kenner et al. ............. | 709/225 |
| 6,446,121 | B1 | * | 9/2002 | Shah et al. ............... | 709/224 |
| 6,574,669 | B1 | * | 6/2003 | Weaver ................... | 709/239 |

OTHER PUBLICATIONS

Lin et al, "An Algorithm for Automatic Topology Discovery of IP Networks", 1998, IEEE, pp. 1192-1196.*
Girardin, Luc, "Cyberspace geography visualization", Oct. 15, 1995, pp. 1-60.*
Gorman, Sean, "The Death of Distance but not the End of Geography: The Internet as a Network", Oct. 29, 1998, pp. 1-34.*
CAIDA.org, Skitter, Jan. 29, 1999, pp. 1-5.*
Rickard, Jack, "Mapping the Internet with Traceroute", internet.com, 1998, pp. 1-14.*
VisualRoute, "The Visual Trace Route Utility", 1999, pp. 1-2.*
Huffaker et al, "Otter: A general-purpose network visualization tool", CAIDA.org, Nov. 1, 1998, pp. 1-11.*
Faloutsos et al, "On Power-Law Relationships of the Internet Topology", ACM, Aug. 1999, pp. 251-262.*

(Continued)

*Primary Examiner*—Ario Etienne
*Assistant Examiner*—Gregory G. Todd

(57) ABSTRACT

A method for mapping a network, in accordance with the present invention, includes providing distance measurements between tracers in the network, determining routes along which the distance measurements are made, and creating a system of equations which links the distance measurements between the nodes with a sum of the delays between the nodes which comprise the routes. Additional information is extracted about distances of subpaths of the routes to provide additional details to a map of the network. The additional information provides a capability of estimation of distances between nodes without tracers.

24 Claims, 4 Drawing Sheets

OTHER PUBLICATIONS

Francis et al, "An Architecture for a Global Internet Host Distance Estimation Service", IEEE, Mar. 1999, pp. 210-217.*

Theilmann et al, "Dynamic Distance Maps of the Internet", IEEE, Mar. 2000, pp. 275-284.*

Jamin et al, "On the Placement of Internet Instrumentation", IEEE, pp. 295-304.*

Francis et al., "An Architecture for a Global Internet Host Distance Estimation Service," IEEE, Mar. 1999, pp. 210-217.

Faloutsos et al., "On Power-Law Relationships of the Internet Topology," Proc. of ACM SIGCOMM, Aug. 1999.

Theilmann et al, "Dynamic Distance Maps of the Internet," IEEE Infocom 2000, Tel-Aviv, Israel, Mar. 2000.

Jamin et al, "On the Placement of Internet Instrumentation," IEEE Infocom 2000, Tel-Aviv, Israel, Mar. 2000.

Bernard M. Waxman, "Routing of Multipoint Connections," IEEE Journal on Selected Areas in Communications, vol. 6, No. 9, pp. 1617-1622, Dec. 1988.

* cited by examiner

METHOD AND APPARATUS FOR NETWORK MAPPING USING END-TO-END DELAY MEASUREMENTS

BACKGROUND OF THE INVENTION

1. Field of the Invention

The present invention relates to network mapping, and more particularly to a method and system for mapping a network to make distance measurements based on delay.

2. Description of the Related Art

While Internet is growing at a remarkable rate there is no central registry that permits users or planners to track this growth. Even simple characterizations of the Internet are under debate. Learning the exact structure of the network seems to be an unrealistic target.

However, in many cases an estimate about the distances between nodes in the network is valuable. One case is the need for a client to select a service from one of several servers located in distant locations. The WWW is an example of such a situation, as more and more popular sites open mirror sites that are geographically scattered to balance not only the computation load among the servers but also the average response time to the users. Other examples where there is a need for a mechanized client selection among servers include distributed object repositories, hierarchical caching, etc.

IDMaps is an example project that attempts to solve this problem by placing measurement stations (tracers) at key locations. These tracers periodically measure the distances among themselves and to regions of the network. The tracers advertise their measurement information to clients that use the measurement information to construct an estimated distance map of the network.

A distance measurement between two IDMaps tracers can be performed in two basic ways. The first is to use the "traceroute" program, known in the art, which generates a series of packets with increasing TTL (time to live) values in their Internet protocol (IP) headers. The TTL field in the IP header is decreased by one in every router that handles the field. When the packet travels a distance equal to its initial TTL, its TTL value is decreased to zero, and the packet is dropped together with the submission of an ICMP packet from the dropping node to the packet originator.

In this way, the source node learns the id's of all the nodes on the route to some destination and the round-trip time (rtt) to this node. A second way to measure distance is by using ping. In this method, a packet is sent to the destination and replied to immediately which results in a single rtt measurement. In variants of ping, different types of packets are sent and the reply packet is sent by a dedicated application (ping) or an application whose reaction time is part of the measurement (e.g., HTTP/web-server).

It is important to note that the "traceroute" program consumes more network resources as the number of message times the number of hops of "traceroute" is quadratic in the hop distance, while ping uses a linear number of messages: one in every hop in each direction. Due to this and other reasons, ping is a preferred measurement method. However, since the route stability between two tracers is an important characteristic, the trace route program is also expected to be used but at a much lower rate than ping.

Distance estimation is important to many Internet applications, most notably for a WWW client that needs to select a server among several potential candidates. To aid in estimating distances on the Internet, conventional research suggested to place tracer stations at key locations. The tracers measure distances among themselves and use the distance measurement to supply client applications with an approximated map of the Internet. There is however a trade-off between the amount of measurement traffic and the accuracy of the mapping. The larger the number of tracers one employs, the better the estimation is, but also the measurement overhead is higher.

Therefore, a need exists for a system and method for mapping a network, which is not subject to the above-mentioned trade-off. A further need exists for a system and method for mapping a network between locations where tracers cannot be placed.

SUMMARY OF THE INVENTION

A method for mapping a network, in accordance with the present invention, includes providing distance measurements between tracers in the network, determining routes along which the distance measurements are made, and creating a system of equations which links the distance measurements between the tracers with a sum of the delays between nodes which comprise the routes. Additional information is extracted about distances of subpaths of the routes to provide additional details to a map of the network. The additional information provides a capability of estimation of distances between nodes without tracers.

Another method for mapping a network, having a plurality of nodes and links, in accordance with the present invention, includes determining distance measurements along routes in the network by employing tracers in the network and identifying the routes in the network where the distance measurements were taken. Crossing points are identified between the measurement routes, and the measurement routes are divided into segments. A segment is a maximal sub-path of a measurement path, whose end-points are either tracers or crossing points and does not include an internal crossing point or a tracer. A system of equations is created which links the distance measurements between the tracers with a sum of the delays on the segments between the nodes. Solutions for a solvable portion of the system of equations are determined to extract additional information about distances of subpaths of the routes to provide detail to a map of the network. The additional information provides a capability of better estimation of distances between nodes without tracers.

Another method for mapping a network, in accordance with the present invention, includes determining measurement routes, grouping nodes along the measurement routes into equivalent classes, based on the equivalent classes, identifying crossing points and dividing the measured routes into segments, and performing distance measurements of determined routes. The routes are partitioned into one or more segments. The tracers are employed for making the distance measurements. A linear equation system is formed that links the distance measurements between the tracers with a sum of the delays of the routes, which comprise the measured routes. A solvable portion of the linear equation system is determined by identifying solvable segments based on the distance measurements (based on, e.g., Algebraic methods). Additional information about distances of subpaths of the routes is extracted to provide additional details to a map of the network. The additional information provides a better capability of estimation of distances in the network In other methods, the step of determining distance measurements between nodes of the network may include the step of taking distance measurements using a ping. The method may include the step of minimizing noise in the distance measurements by employing the additional information in a least squares optimization and minimizing the least squares optimization to account for noise effects. The method may also include the step of weighting the least squares optimization to further account for noise in the distance measurements. The step of extracting additional information about distances of subpaths may include the step of determining for any subpath whether the subpath is solvable. The method may include the step of solving for the subpaths in the system of equations, which are expressed as a linear combination of the measurements. The step of extracting additional information may include the step of measuring multiple distances between at least some of the nodes of the network. The network is preferably the Internet. A program storage device readable by machine, tangibly embodying a program of instructions executable by the machine may be employed to perform the method steps for mapping a network.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to network mapping. A method and system are presented which are based on algebraic tools to extract more data from network measurements, including obtaining good estimates of locations where tracers are not placed. In accordance with the invention, data is effectively obtained from the same measurements as if the number of tracers is several folds larger. The present invention obtains good estimates between locations where tracers cannot be placed. This becomes extremely important when unidirectional measurements are conducted using specialized equipment such as global position satellites (GPS) that cannot be placed everywhere. The present invention also works well with noisy measurements, and in both randomly generated topologies and as exist in Internet measurements.

The present invention increases the effectiveness of end-to-end distance measurements. Given end-to-end distance measurements (e.g., using ping) and the routes along which the measurements were conducted (e.g., using a "traceroute" program), the present invention extracts additional information about the distances of some measurement subroutes. The result is a more detailed network map, and thus a better estimation of some of the distances.

In addition, good estimations about the delay between sites where it is not possible to place tracers are achieved. To measure unidirectional delay, special hardware devices are placed in the network, and synchronized to achieve the measurement accuracy (e.g., by GPS). Applying the present invention on the unidirectional measurements produces additional unidirectional distances between nodes in the networks where such special devices are not (or even cannot be) placed.

Theoretically, in general graphs, the present invention may not appear to one skilled in the art as yielding large gains. However, this is not the case for sparse graphs, especially for the Internet. Using both simulated networks and recent Internet traces, the present invention shows gains of at least 50%–200%. That is, 50%–200% more nodes with known distances to other nodes are available over prior art techniques.

Figure 1:
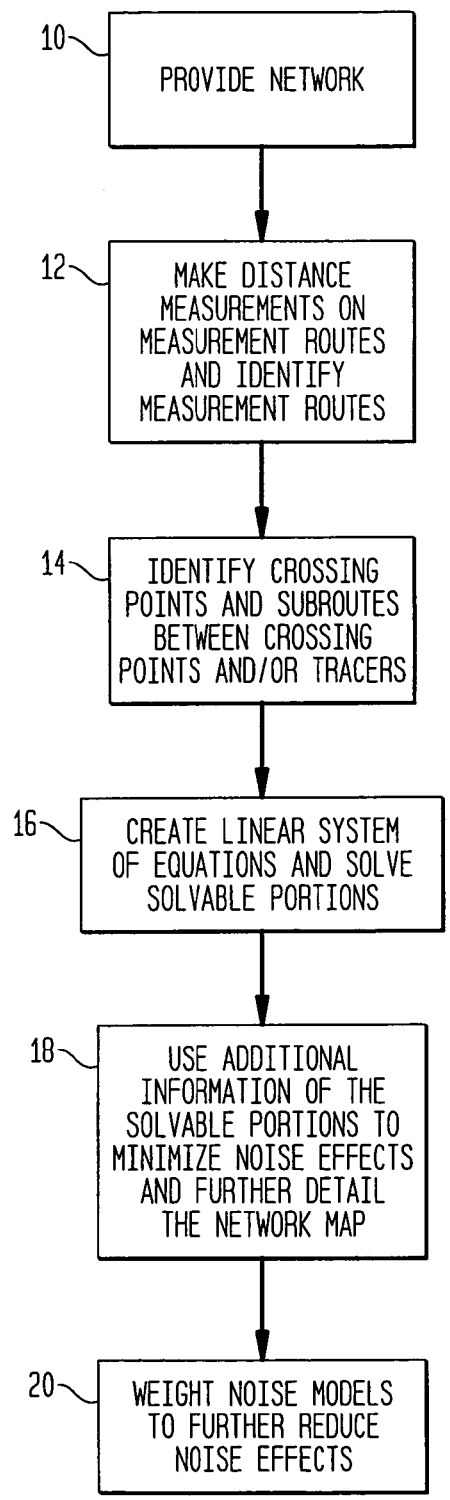
FIG. 1 is a flow diagram for a method of mapping a network in accordance with the present invention.

Referring now to the drawings in which like numerals represent the same or similar elements and initially to FIG. 1, a flow diagram for mapping a network in accordance with the present invention is shown. In block 10, a network is provided which includes multiple nodes and links and a routing algorithm that selects a route between any given two nodes. The network structure, e.g., the node ids, link ids, the number of nodes and links and the route are all unknowns. Tracers, which may include hardware or software devices, known in the art, for making distance measurements from the network nodes which the tracers are connected to, are placed in the network. In block 12, the tracers perform delay measurements among themselves. These measurements may be performed using ping, for example. In addition, the tracers reveal the routes used for each measurement, if they are not known. This may be performed using "traceroute" for example. "Traceroute" is available on all UNIX™ distributions. In block 14, all crossing point (or cross points) between the measurement routes are identified. The measurement routes are divided into segments. A segment is a maximal sub-path of a measurement path, whose end-points are either tracers or crossing points and does not include an internal crossing point or tracer.

In block 16, the relationship between the delay in the defined segments and the end-to-end measurement results are written as a set of linear equations. In one embodiment, Gauss-elimination is employed to triangularize the matrix representation of the system of equations (see matrix A' below). Segments (or segment groups) can be identified whose length can be solved for. Then, the identified segments are solved based on end-to-end measurements of each route. Over-defined portions of the linear system are employed to handle noise, as indicated in block 18. Crossing points may be in locations (by chance or by plan) where one may not be able to place tracers. This enables mapping of areas that are closed to tracer placement (e.g., for the above mentioned unidirectional measurements). This provides improved mapping capabilities as will be described in greater detail below.

The present invention is adapted to handle noisy measurements, for example, by using a least-square distance algorithm. Weights may optionally be employed to model the expected noise process with greater accuracy, as indicated in block 20.

Network Model

Referring again to block 10 of FIG. 1, a network, for example, the Internet, may be modeled as a directed or an undirected graph. The graph structure or size may be unknown, and used only for the purpose of analysis. It is assumed that measurement stations (tracers) are put at some nodes of the graph. The routes between tracers are assumed quasi-static, i.e., they change slowly enough to make their knowledge valuable. On the other hand, distance between nodes is assumed dynamic. Distance may be the propagation delay, the average delay or any other measurable route characteristics. Since delay is currently the characteristic most commonly pursued, distance and delay will be interchangeably used throughout this disclosure.

No assumptions are made about the routing in the network. Although the present invention is easier to describe when the routing is symmetric, the present invention works just as well for asymmetric routing as observed by experiment performed by the inventors on, for example, the Internet.

A measurement path, also termed measurement route (expressed as a list of nodes), between two different tracers in the network is defined by the underlying routing protocol in the network. A measurement graph is the union of all the measurement paths. A crossing point is a non-tracer node that has at least three different neighbors in the measurement graph. Given a network, a set of tracers, and a set of end-to-end delays with their associated routes, all the possible segments or groups of consecutive segments whose length can be derived from the data are to be found using the present invention to map the network.

Figure 2:
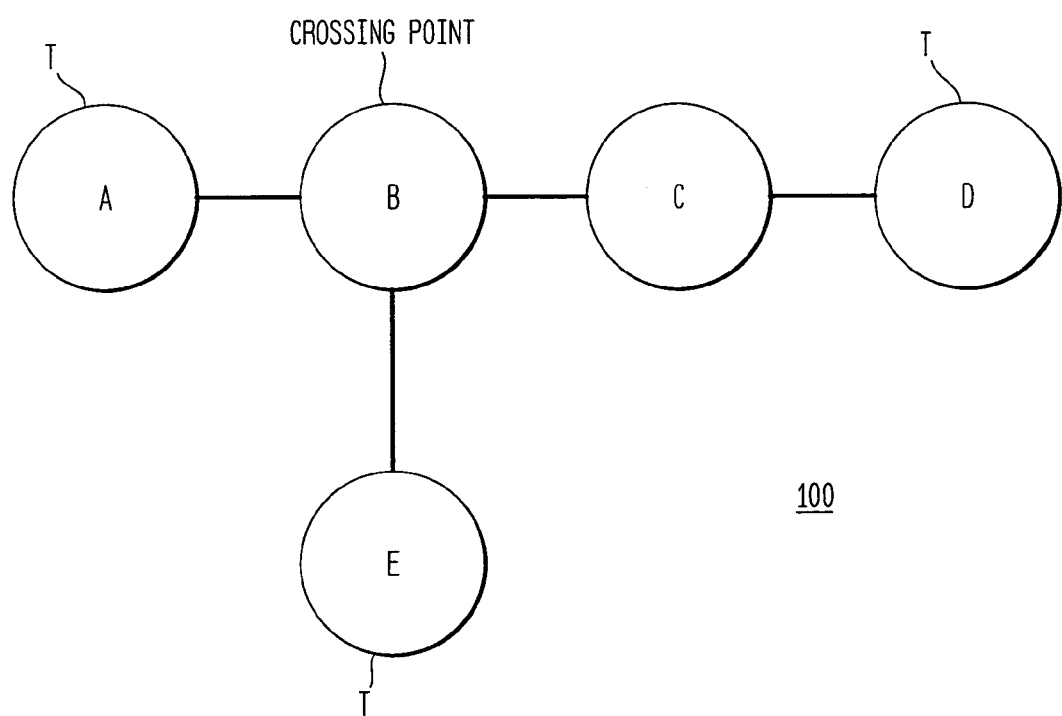
FIG. 2 is a schematic diagram of a network to illustrate the present invention.

Referring to FIG. 2, an illustrative example of a network 100 explains the terms defined above, and the problem to be solved. Consider a five node network, where tracers T are placed at nodes A, D, and E. The following three distances are measured: A–D, E–D, and A–E. Using a route exploration program such as, for example, TRACEROUTE, the three routes, A-B-C-D, E-B-C-D, and A-B-E are obtained, and node B is identified as a crossing-point. This defines three segments: $s_1$=A–B, $s_2$=B–C–D and $s_3$=E–B. Now, suppose that using ping the distances A–D, E–D, and A–E were measured to be 4, 7, and 5, respectively. The following three equations express the ping measurement data using the segments identified from the TRACEROUTE information:

$$s_1+s_2=4$$

$$s_2+s_3=7$$

$$s_1+s_3=5 \qquad (1)$$

In this case, three linearly independent equations with three variables are obtained, which can be solved to obtain the delay in each of the three segments: $s_1$=1, $s_2$=3, $s_3$=4.

The present invention is easily extendible to asymmetrical networks well. Noise is easily treated by using, for example, a least mean square algorithm to obtain a solution that is the closest to all measurement points.

Figure 3:
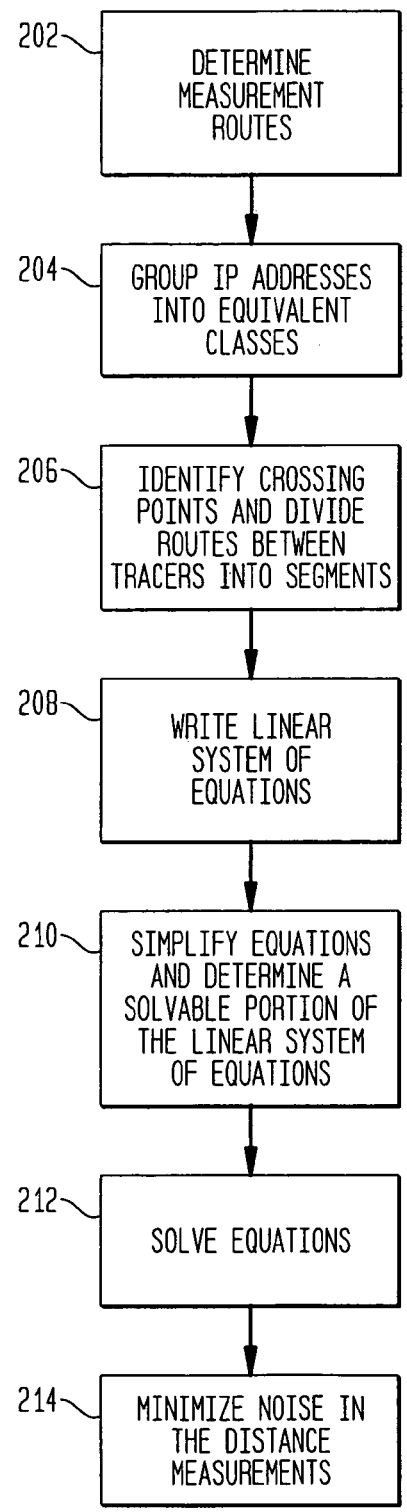
FIG. 3 is a flow diagram for showing the method of FIG. 1 in greater detail in accordance with the present invention.

Referring to FIG. 3, a more detailed flow diagram for mapping a network in accordance with the present invention is shown. In block 202, measurement routes are determined for a network. The routes are identified and measured as described above in block 12 of FIG. 1. Given the measurement routes, addresses, such as IP addresses, are grouped into equivalent classes, in block 204. An equivalent class can be a group of all interfaces that belong to the same machine, a group of IP addresses that belong to machines in the same site, e.g., all the BBNPLANET routers in Boston, Mass., or any other type of grouping. Based on the equivalent classes, all the crossing points are identified, and all the routes between tracers to segments are divided, in block 206. Segments that appear in the exact same equations are merged to a single super-segment.

In block 208, a linear equation system is written that links each route measurement with the sum of the delays of the segments that comprise the measured route. A measurement may be made, for example, by applying some function on a set of ping measurements. In the simplest case, one ping measurement is performed, but an average of several measurements may be used, or more likely the minimum measurement of the set may be used. This may be any other path delay measurement technique known in the art. The linear system may be under-defined for some variables and over-defined for others. Since our goal is to extract as much information as possible from the given measurements, these equations will not be solved yet. Instead, it is desired to determine for any segment (or a consecutive group of segments (This is not to be confused with the super-segment described above, which is inputted to the method as a regular segment)) whether it can be expressed as a linear combination of the given measurements.

In block 210, the equations are simplified so that it can be determined what is solvable. The general form of the equations obtained after grouping the segments is as follows:

$$a_{11}x_1 + a_{12}x_2 + \ldots + a_{1m}x_m = b_1 \qquad (2)$$
$$a_{21}x_1 + a_{22}x_2 + \ldots + a_{2m}x_m = b_2$$
$$\vdots \qquad \vdots \qquad \ddots \qquad \vdots$$
$$a_{n1}x_1 + a_{n2}x_2 + \ldots + a_{nm}x_m = b_n$$

where $x_i$ (i=1,2, ..., m) are the lengths of the m segments; $b_i$ (i=1,2, ..., n) are lengths of the given paths; and $a_{ij}$ (i=1,2, ..., n; j=1,2, ..., m) is 1 if the jth segment (or super-segment) is on the ith given path, and 0 otherwise. Denote $A=\{a_{ij}\}$ the n×m matrix induced by the equations. Therefore, equation (2) can be rewritten with vectors as:

$$Ax=b \qquad (3)$$

If Eq. 3 is not under-defined, then the columns of matrix A should be linear independent. Otherwise, there should be dependency among the columns. Gauss-elimination may be used on columns of A to transform A into the matrix A' of the following form (a '*' means 'any number'):

$$A' = \begin{pmatrix} 1 & 0 & \cdots & 0 & 0 & \cdots & 0 \\ * & 1 & \cdots & 0 & 0 & \cdots & 0 \\ * & * & \ddots & 0 & 0 & \cdots & 0 \\ * & * & * & 1 & 0 & \cdots & 0 \\ * & * & * & * & 0 & \cdots & 0 \\ \vdots & \vdots & \vdots & \vdots & \vdots & \vdots & \vdots \\ * & * & * & * & 0 & \cdots & 0 \end{pmatrix}$$

where only the first m'<m columns are nonzero. In other embodiments, the 1's in the diagonal of matrix A' may be any real number. Clearly, the first m' columns are linearly independent. Suppose that T is the m×m matrix such that $$A'=AT,$$

and y is another set of unknowns, s.t., $$x=Ty.$$

We can rewrite the vector equation (3) as $$A'y=b. \qquad (4)$$

Clearly, only $y_i$ with $1 \leq i \leq m'$ are solvable from the new equations. The equations are solved in block 212. If the new equations are over-defined for $y_i$ ($1 \leq i \leq m'$), i.e., there are more than m' equations for the m' $y_i$'s, advantage is taken of the extra data to better handle noise in block 214. Instead of simply solving the m' equations, the invention solves $y_i$ ($1 \leq i \leq m'$) with a least square algorithm which may be, for example, the algorithm described below, where the $y_i$ ($1 \leq i \leq m'$) that minimizes the function $$\sum_i w_i \left( \sum_j a'_{ij} y_j - b_i \right)^2, \quad (5)$$

is found where $w_i$'s are positive weights.

It is important to note that the method of the present invention has no error if the given lengths are the exact lengths of the measured paths, and in this case, solving the m' equations is sufficient for an exact answer. However, noise appears in practice in distance measurement and the present approach uses as much information as possible to advantageously minimize its effect.

When there is noise in the measurements, one can apply different assumptions on the noise behavior through the assignment of the weights, $w_i$ (see Eq. (5)). For example, weights such as $$w_i = 1/b_i^2$$

may be employed.

Returning to block 212, each sub-path, p, of the given paths can be expressed as a 0–1 combinations of segments, e.g., a sub-path can be written as a product of a 0–1 row vector r and the column vector.

$$p = \sum_{i=1}^m r_i x_i \quad (6)$$

An efficient way to check whether p is solvable is based on the paths measured. Using x=Ty, it can be written:

$$p = rx = rTy = \sum_{ij} r_i T_{ij} y_j = \sum_j \left( \sum_i r_i T_{ij} \right) y_j. \quad (7)$$

Thus, p can be solved and expressed as a linear combination of $y_i$'s for $1 \leq i \leq m'$ if the coefficients of $y_i$ for $i > m'$ are all 0, i.e., if $$\sum_i r_i T_{ij} = 0, \forall j > m' \quad (8)$$

If the condition in Eq. (8) is true, the solution for p is obtained by plugging the already solved $y_j$ ($1 \leq j \leq m'$) values in Eq. (7).

Delay or distance measurements may include a plurality of different techniques, for example, unidirectional, symmetric round trip time (rtt), and asymmetric rtt. The simplest case is the unidirectional case. A directed segment is identified as a concatenation of directed links. In this case, a link (A,B) is different from the link (B,A), and the segment (A,B) is different from the segment (B,A). In the symmetric rtt case, the link/segment (A,B) is identical to the link/segment (B,A). The delay result for a segment, represents the rtt delay along this segment. This may not be practical for the Internet, however.

In practice, the routing in the Internet is asymmetrical, i.e., the opposite route between two nodes may be totally or partially disjoint. It is possible to use the present invention by using one of the two routes between every two nodes.

A better solution is to use directional links and segments as in the unidirectional case. This enables the extraction of the maximum possible information from the data.

Figure 4:
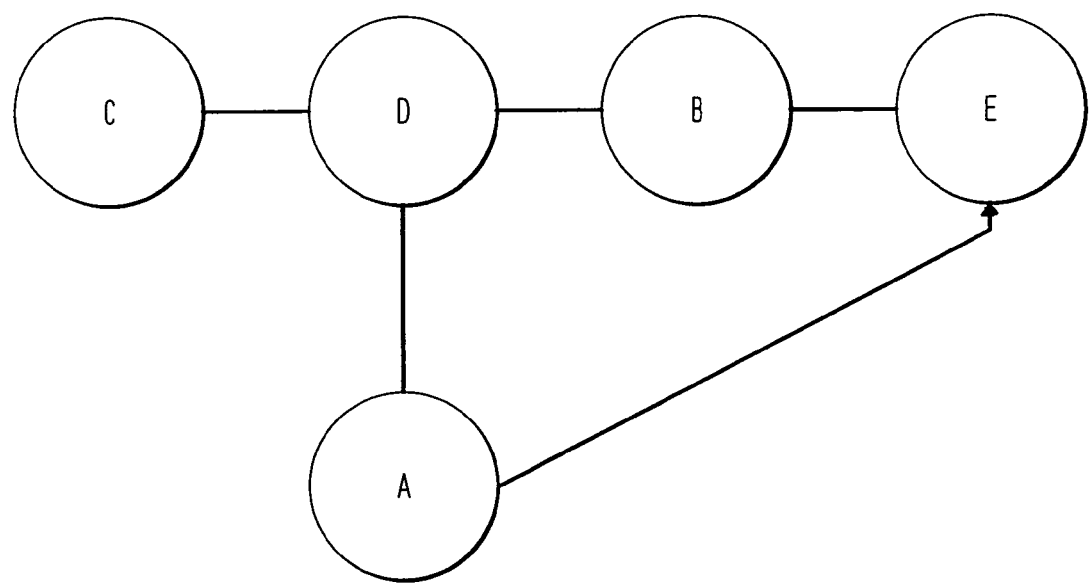
FIG. 4 shows an example network having a directional link between a pair of nodes.

The example network of FIG. 4 includes nodes A, B, C, D and E arranged as shown, with a directional link between nodes A and E as indicated by the arrow.

Complexity

An equivalence list is built which includes a list of paths, which supply the same information. This only needs to be done once, and may need only minor periodic adjustments as route changes may reveal new nodes. Thus, its complexity is amortized over many calculations and is negligible.

Starting with t tracers one may reveal n nodes. Assuming, that the equivalence list is kept in, for example, a hash table, converting the n nodes to their equivalent is a linear process. Using different hash tables one can identify the crossing points and identify the segments in $O(n)$. The $O(t^2)$ equations may be written as $O(mt^2)$ where m is the number of segments.

Triangulating the equation with the Gaussian elimination requires $O(t^2 \text{ mm}')$, where m' is the number of solvable segments. Each line triangulation needs an $O(nm)$ operation, and the process stops when no more lines can be triangulized, i.e., after m' iterations. The segments or segment groups, which are solvable, need $O(m^2)$.

Calculating the length of a segment or a segment group (using Eq. 7) is $O(m')$ per solvable segment, and $O(m'^2)$ in total. If the routing does not change and new delay measurements arrive the complexity of recalculating the delays of all the solvable segments is only $O(m'^2)$.

Evaluation

The present invention was tested on randomly generated networks, and on measurements taken from the Internet. In both cases, the present invention succeeds to identify a significant number of distances between tracers and crossing points, and among the crossing points. For the Internet data, the algorithm discovered distances to as many crossing points as the original number of tracers, e.g., a 100% gain. For the randomly generated networks, the gain was over 200% when we used the Waxman method (EX Model), described by Bernard M. Waxman in "Routing of multipoint connections," *IEEE Journal on Selected Areas in Communications,* 6(9):1617–1622, December 1988, and by greater than about 50% when the networks generated were generated according to the recently discovered power-log law on the node connectivity (PL Model) as described in Faloutsos et al., "On power-law relationships of the Internet topology," *Proc. of ACM SIGCOMM,* August 1999.

EX model—In the EX model the probability of two nodes to be connected by a link decreases exponentially with the distance between them. This models intranets nicely.

PL model—In the PL model the node connectivity follows a power-log rule: very few nodes have high connectivity, and the number of nodes with lower connectivity increases exponentially as the connectivity decreases. This model is based on measurements in the Internet, where a node is an autonomous system (AS).

We built networks comprised of 600 and 1000 nodes using both above topology generation rules. In these networks, we assigned tracers randomly to the network nodes.

For both topologies, the percentage of revealed nodes increases with the number of tracers however the two topologies differ in other aspects. For the PL topologies the algorithm finds 55%–80% new nodes (for over 15 tracers), while for the EX topologies the algorithm reveals from 100% to over 200% new nodes. An interesting difference between the two topologies is that while for the PL topologies the algorithm performance decreases with the network size, for the EX topologies the performance improves with the size. The present invention shows that on average, for each newly revealed node there are many (e.g., at least 20–50%) new distances that can be calculated.

Internet Measurements

In this experiment, a set of machines were selected (tracers) and conducted traceroute measurements between all pairs of machines in this set. We used up to 33 publicly available traceroute servers out of the 96 US sites available at www.traceroute.org.

Using 33 Tracers, we conducted 33*32=1056 traceroutes. Eight of them were not usable, (e.g., one measurement had a routing loop) and were discarded. The traceroutes revealed 2115 interfaces that we identified using DNS queries, 122 were not in the DNS database. Using the interface names, we unified them into 652 equivalence classes, connected with 846 segments.

The system we fed our method of the present invention with had 1048 equations and 846 variables. The method solved 593 of the y variables (see Eq. 4), that translated to 499 new distances.

Although the sites were selected arbitrarily without any optimization attempt, we were able to obtain distances to an additional 33 nodes, typically, POPs of various backbone Internet service providers (ISPs).

Having described preferred embodiments of a method and apparatus for network mapping using end-to-end delay measurements (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for mapping a network comprising the steps of:
   providing distance measurements between tracers in the network;
   determining routes along which the distance measurements are made;
   creating a system of equations, which links the distance measurements between the tracers with a sum of the delays between the nodes, which comprise the routes; and
   extracting additional information about distances of subpaths of the routes to provide additional detail to a map of the network, the additional information providing a capability of estimation of distances between nodes without tracers.

2. The method as recited in claim 1, wherein the step of providing distance measurements includes the step of taking distance measurements using a ping.

3. The method as recited in claim 1, further comprising the step of minimizing noise in the distance measurements by employing the additional information in a least squares optimization and minimizing the least squares optimization to account for noise effects.

4. The method as recited in claim 3, further comprising the step of weighting the least squares optimization to further account for noise in the distance measurements.

5. The method as recited in claim 1, wherein the step of extracting additional information about distances of subpaths includes the step of determining for any subpath whether the subpath is solvable.

6. The method as recited in claim 1, wherein the step of extracting additional information includes the step of measuring multiple distances between at least a subset of the nodes of the network.

7. The method as recited in claim 1, wherein the network is the Internet.

8. A program storage device readable by machine, tangibly embodying a program of instructions executable by the machine to perform method steps for mapping a network in accordance with claim 1.

9. A method for mapping a network, having a plurality of nodes and links, comprising the steps of:
   determining distance measurements along routes in the network by employing tracers in the network;
   identifying the routes in the network where the distance measurements were taken;
   identifying crossing points between the measurement routes;
   dividing the measurement routes into segments, where a segment is a maximal sub-path of a measurement path, whose end-points are either tracers or crossing points and does not include an internal crossing point or tracer;
   creating a system of equations which links the distance measurements between the tracers with a sum of the delays on the segments between the nodes; and
   determining solutions for a solvable portion of the system of equations to extract additional information about distances of subpaths of the routes to provide detail to a map of the network, the additional information providing a capability of estimation of distances between nodes without tracers.

10. The method as recited in claim 9, wherein the step of determining distance measurements includes the step of taking distance measurements using a ping.

11. The method as recited in claim 9, further comprising the step of minimizing noise in the distance measurements by employing the additional information in a least squares optimization and minimizing the least squares optimization to account for noise effects.

12. The method as recited in claim 11, further comprising the step of weighting the least squares optimization to further account for noise in the distance measurements.

13. The method as recited in claim 9, wherein the extracting of additional information about distances of subpaths includes the step of determining for any subpath whether the subpath is solvable.

14. The method as recited in claim 9, wherein the extracting of additional information includes measuring multiple distances between at least a subset of the nodes of the network.

15. The method as recited in claim 9, wherein the network is the Internet.

16. A program storage device readable by machine, tangibly embodying a program of instructions executable by the machine to perform method steps for mapping a network in accordance with claim 9.

17. A method for mapping a network comprising the steps of:
   determining measurement routes in a network;
   grouping nodes along the measurement routes into equivalent classes;
   based on the equivalent classes, identifying crossing points and dividing the measurement routes into segments;
   performing distance measurements on the measurement routes between tracers in the network, the tracers being employed for making the distance measurements;
   forming a linear equation system that links the distance measurements between the tracers with a sum of the delays of the segments which comprise the measured routes;
   determining a solvable portion of the linear equation system by identifying solvable subpaths based on the distance measurements; and
   extracting additional information about distances of subpaths of the routes to provide detail to a map of the network, the additional information providing a capability of estimation of distance to crosspoints.

18. The method as recited in claim 17, wherein the step of performing distance measurements includes the step of taking distance measurements using a ping.

19. The method as recited in claim 17, wherein the step of extracting additional information includes the step of over-defining some of the routes to provide the additional information.

20. The method as recited in claim 17, further comprising the step of minimizing noise in the distance measurements by employing the additional information in a least squares optimization and minimizing the least squares optimization to account for noise effects.

21. The method as recited in claim 20, further comprising the step of weighting the least squares optimization to further account for noise in the distance measurements.

22. The method as recited in claim 17, wherein the step of extracting additional information includes the step of measuring multiple distances between at least a subset of the nodes of the network.

23. The method as recited in claim 17, wherein the network is the Internet.

24. A program storage device readable by machine, tangibly embodying a program of instructions executable by the machine to perform method steps for mapping a network in accordance with claim 17.

\* \* \* \* \*